UNITED STATES PATENT OFFICE.

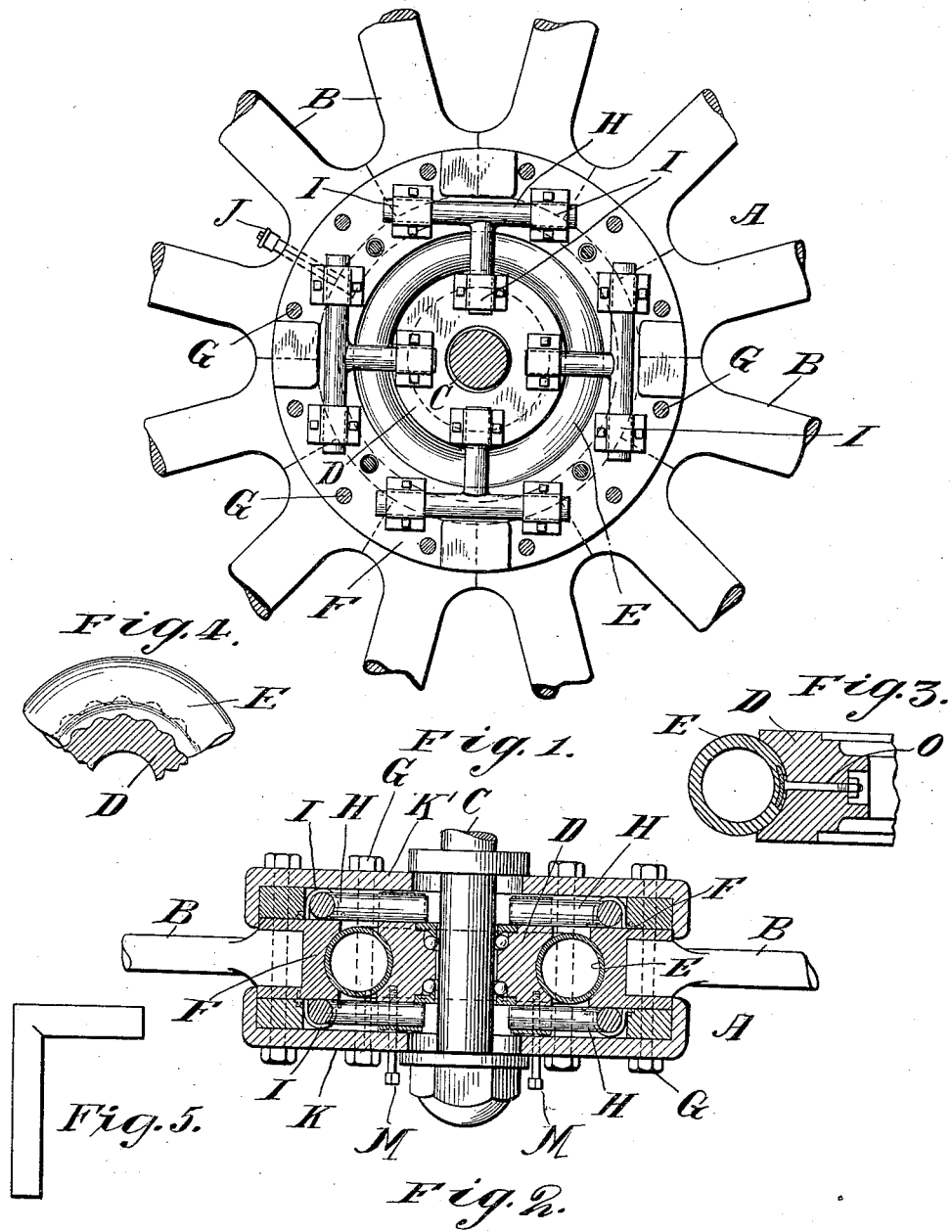

MICHELE BERARDINI, OF PHILADELPHIA, PENNSYLVANIA, AND MICHELE GUGLIELMO DE SIMONE, OF NEW YORK, N. Y.; SAID DE SIMONE ASSIGNOR OF ONE-THIRD OF HIS INTEREST TO SAID BERARDINI.

VEHICLE-WHEEL.

1,064,189.  Specification of Letters Patent.  Patented June 10, 1913.

Application filed June 17, 1912.  Serial No. 704,183.

*To all whom it may concern:*

Be it known that we, MICHELE BERARDINI, a citizen of the United States, residing in Philadelphia, in the county of Philadelphia and State of Pennsylvania, and MICHELE GUGLIELMO DE SIMONE, a subject of the King of Italy, residing in the borough of Manhattan, city, county, and State of New York, have invented certain new and useful Improvements in Vehicle-Wheels, of which the following is a specification.

This invention relates to vehicle wheels and aims to provide certain improvements therein.

The object of the present invention is to construct a wheel which affords a satisfactory substitute for a pneumatic tired wheel, but in which the danger of puncture incident to the use of pneumatic tires is avoided, as well as the heavy cost and expensive upkeep of the latter.

To this end the invention comprises a wheel having arranged between its periphery and its hub and preferably close to the hub resilient means which will permit the relative movement of the wheel to the axle in inequalities of the road bed while relative rotative movement between the hub and the periphery of the wheel is avoided.

According to the preferred form of our invention we utilize a pneumatic cushion between the hub of the wheel and its periphery, but to avoid relative circumferential movements we arrange a connection between these two parts which prevents such circumferential movement while permitting free movements of the hub and wheel in any other direction. By this means all twisting strains with resultant frictional losses and excessive wear upon the cushion are avoided.

The invention comprises certain other improvements which will be hereinafter more fully described.

Referring to the accompanying drawings which illustrate one form of the invention,—Figure 1 is a side elevation of the preferred form of the invention with one of the side plates omitted. Fig. 2 is a diametrical section of Fig. 1. Figs. 3, 4 and 5 are detail views.

Referring to the drawings, let A indicate the wheel as a whole having a series of spokes B connected to the rim, which is not shown. The wheel rotates upon an axle C, ball bearings being interposed as usual. The wheel hub proper is indicated by the reference letter D and between such hub and the periphery of the wheel is interposed a resilient device E and in the construction shown this device comprises a pneumatic cushion which is interposed between the hub D and a ring F to which the spokes B are connected on their inner ends. Preferably the ring F is channeled on its outer side to receive the spokes which are held in place by suitable bolts G. In the construction thus described the pneumatic cushion or other resilient means is adapted to receive the shocks due to the inequality of the road bed, and to absorb the same so that the latter are not transmitted to the axle C. By this means a resilient wheel is provided which in the case of the use of a pneumatic cushion especially is well adapted to take the place of a pneumatic tire. Such a connection like a pneumatic tire provides a circular column of air surrounding the hub and upon compression of this column at any point the pressures distribute themselves entirely around the hub in the same manner as a pneumatic tire. If, however, the construction thus described were utilized alone, it would be found that there were developed circumferential strains between the hub and the periphery of the wheel which would speedily wear out the pneumatic cushion or other resilient connection so as to render the device impracticable. This is particularly true for the driving wheels of an automobile, although it is also true in connection with the front or steering wheels. We hence provide a connection between the hub and the ring F which prevents relative circumferential movement of these two parts while nevertheless permitting relative movements in other directions, and particularly movements in vertical directions which are necessary in order to absorb the shocks and jars to which the wheel is subjected. The means we prefer to employ for this purpose are shown in the drawings, although it will be understood other equivalent means may be employed. In the drawings we have shown a number of T-shaped members H which are slidingly connected to both the hub and the ring F. Preferably two of the branches of the structure are connected to the ring and one to the hub. This connection may be any suitable connection but we have shown it as bearings I encircling the branches of the T connection and bolted to the respective parts. The connections instead of being made T-shaped may be made L-shaped, as illustrated in Fig. 5. In any event the sliding means should be angular, that is to say, each member should be capable of sliding in one direction relatively to the hub and in a direction at an angle thereto relatively to the ring. By this means the hub is permitted to move relatively to the ring or vice versa in any direction except rotatively. That is to say, the hub is permitted to move directly to any position with relation to the ring so long as this movement is not accompanied by any relative rotation. All of the driving strains are hence transmitted directly from the wheel to the hub or vice versa without placing any strain upon the pneumatic cushion or other resilient connection. The function of the latter is hence restricted to that of taking up the shocks by compression and expansion. Therefore the fabric of the connection is not subjected to extraordinary strains and friction as has heretofore been the case in devices of this general type.

The pneumatic cushion may be made of any desirable size and may be inflated through a valve J. In place of the cushion other suitable resilient means may be used if desired. The pneumatic cushion may be fixed with relation to the hub by means of stay bolts O embedded in or connected to the cushion as shown in Fig. 3, or the concave face of the hub may be roughened or corrugated if desired, as shown in Fig. 4.

Preferably the system of connecting members H is duplicated on each side of the wheel as best shown in Fig. 2. Preferably also the device is more or less inclosed by plates K K' so as to exclude dust, moisture, etc. These plates may be freely removable, being shown as held in place by the bolts G. Preferably the outer side of the hub and the inner side of the ring are concaved as shown, so that the pneumatic cushion assumes a more or less circular form in cross section.

By the present invention means are provided for permitting the use of the wheel even though the pneumatic cushion or other resilient means are temporarily inoperative. Such means comprise devices for holding the wheel and hub in concentric relation, and in their simplest form comprise bolts or set screws M M as shown in Fig. 2. Such bolts may conveniently pass through the plate or plates K and engage screw-threaded sockets in the hub D. In the ordinary pneumatic tired wheel it is dangerous to run a car after the tire is deflated on account of the difference in diameter of the wheel due to the deflation. Furthermore, it is almost certain to injure or destroy the tire shoe. In the present construction when the hub and wheel are concentrically fixed, the wheel retains its initial diameter while the cushion or other resilient device is not injured.

By the invention thus described we are enabled to obtain a high degree of resiliency with much less cost than is now possible in the case of a pneumatic tire. The pneumatic cushions are relatively small and hence require but a fraction of material and labor necessary for the production of the present type of tires. Furthermore, the disadvantages of pneumatic tires are largely minimized. That is to say, it is impossible to cut the cushion by stones or other obstructions on the road and the heat due to the frictional contact of the pneumatic tire with the road is avoided. Furthermore, the shock of an obstruction is distributed over a much larger area than in the case of a pneumatic tire.

The construction described permits the relative movement of the hub and wheel in all directions in the same plane, while preventing any relative rotative movement thereof. If desired, a slight lateral play may be afforded between the parts by fitting the members H loosely in the bearings I, or in any other suitable manner, so that the wheel may yield somewhat when it comes in contact laterally with an obstruction.

While we have shown and described one form of the invention, it is to be understood that we do not wish to be limited thereto, since various changes can be made therein without departing from the invention.

What we claim is:—

1. A vehicle wheel comprising a hub, an annular member surrounding said hub, a pneumatic tire between said hub and annular member, and a plurality of members engaging said annular member and hub, said members each having a radial arm and a fixed arm at right angles thereto, said radial arm having radial sliding movement and said other arm having tangential sliding movement with relation to the parts which they respectively engage.

2. A vehicle wheel comprising a hub, an annular member surrounding said hub, a pneumatic tire between said hub and annular member, and a plurality of integral T-shaped members engaging said annular member and hub, one arm of each of said T-shaped members having radial sliding movement and the other arm of each of said members having tangential sliding movement with relation to the parts with which they respectively engage.

3. A vehicle wheel comprising a hub, an annular member surrounding said hub, a pneumatic tire between said hub and annular member, and a plurality of members engaging said annular member and hub at each side thereof, said members each having a radial arm and a fixed arm at right angles thereto, said radial arm having radial sliding movement and said other arm having tangential sliding movement with relation to the parts which they respectively engage.

In witness whereof, we have hereunto signed our names in the presence of two subscribing witnesses.

MICHELE BERARDINI.
MICHELE GUGLIELMO DE SIMONE.

Witnesses:
THOMAS T. WALLACE,
FRED WHITE.

Copies of this patent may be obtained for five cents each, by addressing the "Commissioner of Patents, Washington, D. C."